United States Patent

Algar

[11] Patent Number: 5,792,360
[45] Date of Patent: Aug. 11, 1998

[54] WATER TREATMENT SYSTEM COMPRISING WATER-SOLUBLE GLASS

[75] Inventor: Brian Edward Algar, Southampton, England

[73] Assignee: Borden Chemical UK Limited, Southhampton, England

[21] Appl. No.: 676,248

[22] PCT Filed: Nov. 10, 1994

[86] PCT No.: PCT/GB94/02474

§ 371 Date: Aug. 9, 1996

§ 102(e) Date: Aug. 9, 1996

[87] PCT Pub. No.: WO95/13988

PCT Pub. Date: May 26, 1995

[30] Foreign Application Priority Data

Nov. 13, 1993 [GB] United Kingdom ............ 9323484

[51] Int. Cl.$^6$ .................................... C02F 5/04
[52] U.S. Cl. ............. 210/697; 210/198.1; 252/176; 422/18; 422/264; 422/278
[58] Field of Search .................... 210/696, 697, 210/206, 198.1; 422/18, 19, 261, 264, 278; 252/176

[56] References Cited

U.S. PATENT DOCUMENTS

| | | |
|---|---|---|
| 3,116,105 | 12/1963 | Kerst ......................... 210/697 |
| 3,372,110 | 3/1968 | Fuchs ......................... 210/697 |
| 3,469,696 | 9/1969 | Petrucci et al. ............ 210/697 |
| 3,772,193 | 11/1973 | Nelli et al. ................. 422/261 |
| 4,347,224 | 8/1982 | Beckert et al. . |
| 4,822,579 | 4/1989 | Wagner . |
| 4,902,432 | 2/1990 | Kuno . |
| 4,931,078 | 6/1990 | Yamamoto . |

FOREIGN PATENT DOCUMENTS

| | | |
|---|---|---|
| 0390353 | 10/1990 | European Pat. Off. . |
| 0399652 | 11/1990 | European Pat. Off. . |
| 3630538 | 3/1988 | Germany . |

*Primary Examiner*—Peter A. Hruskoci
*Assistant Examiner*—Betsey J. Morrison
*Attorney, Agent, or Firm*—Watson Cole Stevens Davis, P.L.L.C.

[57] ABSTRACT

A water treatment system for submersion in a body of water to be treated comprises a water-soluble glass treatment agent and a water-insoluble retaining means for the water-soluble glass treatment agent. The retaining means is adapted, in use, to retain water in contact with the water-soluble glass and may be a hollow container for the water-soluble glass or a moisture penetrable polymer composition which can be used as a matrix containing particulate water soluble glass. The water-treatment system may be immersed in water to act over an extended period of time in preventing or reducing problems caused by corrosion, scaling and/or fouling.

11 Claims, 1 Drawing Sheet

WATER TREATMENT SYSTEM COMPRISING WATER-SOLUBLE GLASS

Most of the water employed for industrial purposes is used for cooling a product or process. The availability of water in most industrialised areas and its high heat capacity have made water the favoured heat transfer medium in industrial and utility type applications.

Modern cooling towers are evaporative cooling systems which substantially reduce water use rate compared to the older once through systems. These changes in cooling water system design and operation have a profound impact on the chemistry of water as it influences corrosion, deposition and fouling potential in the system.

Corrosion is a function of water characteristics and the metals in the system. Corrosion causes premature metal failure; deposits of corrosion products reduce both heat transfer and flow rates.

Scale (deposition) is caused by precipitation of compounds that become insoluble at higher temperatures such as calcium carbonate. Scale interferes with heat transfer and reduces flow.

Fouling results from the settling out of suspended solids, build up of corrosion products and growth of microbial or algal masses. Fouling can result in reduced heat transfer but more importantly in the growth of health-threatening bacteria, such as *Legionella pneumophilla*.

Cooling water systems are conventionally treated with a range of chemicals to prevent or reduce the problems caused by corrosion, scaling and fouling. Examples of such conventional chemical treatments are shown in the following table:

Chemical Components of Cooling Water Treatments

| Chemical Treatments | Problems | | | |
|---|---|---|---|---|
| | Corrosion | Scaling | Fouling | Microbes |
| Chromates | X | | | |
| Zinc | X | | | |
| Molybdates | X | | | |
| Silicates | X | | | |
| Polyphosphates | X | X | | |
| Polyol esters | | X | | |
| Phosphonates | X | X | | |
| All-organics | X | X | X | |
| Natural Organics | | | X | |
| Synthetic polymers | | X | X | |
| Nonoxidizing biocides | | | X | X |
| Chlorine/bromine | | | | X |
| Ozone | | | | X |

These conventional chemical treatments are either used as intermittent doses or are added continuously via a dosing pump. It would be a significant improvement if chemicals could be released continuously into the water thus eliminating the need to handle the generally toxic chemicals on a regular basis or to rely on the dosing pump working without breakdown.

The solubility of phosphate glasses and their ability to deliver long chain alkali polyphosphates or metal ions continuously to water bodies or other aqueous media is well known. However, until now there has been no method available whereby the glass could be used in a range of waters and dissolve at a known consistent controlled rate.

The present invention provides a water treatment system for submersion in a body of water to be treated which system comprises a water-soluble glass treatment agent and a water-insoluble retaining means for the water-soluble glass, the said retaining means being adapted, in use, to prevent a flow of water from contacting the water soluble glass and to retain water in contact with the water-soluble glass such that the water-soluble glass dissolves in the retained water forming dissolution products therein and to allow said dissolution products to diffuse into the body of water being treated. The present invention also provides a method of treating water comprising submerging into a body of water to be treated a system as herein described. The system is suspended in, or otherwise submerged in, the body of water to be treated. In use, the retaining means for the water-soluble glass retains water in contact with the water-soluble glass. The glass starts to dissolve in the water retained or trapped in the retaining means and this trapped water becomes concentrated with the products of the glass dissolution.

Under these conditions the soluble glass will dissolve at a rate which is substantially independent of the hardness of the water. The products of dissolution will diffuse into the body of water. It is essential that the retaining means is capable, in use, of retaining water in contact with the watersoluble glass. If there is a flow of water through the retaining means and the dissolution products cannot build up to a high concentration (>1 g/l) then the glass solubility rate will be reduced by hardness in the water and, in the extreme case, glass dissolution will be prevented. For this reason, the retaining means should not allow a flow of water to come into contact with the water-soluble glass.

According to a first preferred embodiment, the water-soluble glass treatment agent is retained inside a container formed from a water-resistent material having a top and a bottom and wherein the interior of the container communicates with the exterior thereof by means of one or more openings provided at or near to the bottom of the container. In use the system is suspended in the body of water with the openings in the container downwards. To aid the initial submersion of such a system in the body of water to be treated the container may additionally be provided with a closable inlet at or near its top. Initially, such an inlet will be open to allow the water to fill the container as it is being submerged in the water. However, when the container is full the inlet is then closed. The closure of the inlet will then prevent any flow of water through the container. As the water-soluble glass starts to dissolve in the water which is trapped inside the container dissolution products begin to build up inside the container. These products of dissolution, being dense, will diffuse through the openings provided at or near the bottom of the container and into the body of water.

The container which is hollow may be formed of any material resistant to water. Although a metal container may be used it is preferred that the container is formed of a plastics material that will not undergo rapid physical deterioration when immersed in water for a long time. The shape of the container is not significant and, for this reason, the container will typically be cylindrical to enable economical manufacture. As an alternative to providing a series of perforations in the bottom of the container, the bottom end of the container, or a part thereof, may be formed of a mesh screen.

According to a second preferred embodiment, the water-soluble glass treatment agent is retained in a polymer matrix. The polymeric material will most preferably be one which is susceptible to penetration by water so that water can permeate through the polymeric matrix to achieve optimum contact with the water-soluble glass retained therein and so that dissolution products, formed when the water-soluble glass dissolves, may diffuse into the body of water being treated. Examples of suitable polymeric materials which have the property of being penetrable by moisture and which are useful to form the polymer matrix include epoxy resins and polyesters. In view of their susceptibility to moisture penetration, polyesters are preferred for use in this embodiment of the invention. According to this embodiment, the amount of water-soluble glass used in typically from 10 to 60%, preferably 20 to 40%, by weight based on the total weight of water-soluble glass and polymer matrix.

Typically, the water-soluble glass used in the water treatment system of the present invention will be in the form of granules. This is particularly desirable when the water-soluble glass is retained in a polymer matrix since the particular or granulated glass may be dispersed with ease into the polymeric material used to form the matrix. Obviously, the use of particular or granulated water-soluble glass increases the surface area of the glass for contact with the water.

The water treatment system according to this second preferred embodiment is especially suitable for carrying out long term treatments of relatively small volumes of water whereas the treatment system according to the first preferred embodiment (ie, using a hollow container as retaining means) is far more suitable for short term treatments (for instance, treatments of up to 30 days in duration) of large volumes of water.

The water-soluble glass may be any controlled release glass composition, such as a phosphate or borate glass. Typically, it will be an alkali poly-phosphate, preferably sodium polyphosphate glass since this has antiscaling activity in hard water. The polyphosphate may additionally contain one or more of copper, silver, zinc or a soluble compound containing any of these.

The water-insoluble retaining means may contain a number of different water-soluble glasses. This may be desirable when ions required to be released into the body of water cannot be provided by a single water-soluble glass source. Preferably, at least one of the water-soluble glasses used will be one that dissolves to give long chain alkali polyphosphates in solution since these will effectively condition the water into which any other glasses dissolve by reducing the level of calcium phosphate scale formation from these other glasses. In hard waters calcium phosphate scale would normally be deposited from these glasses so as to leave behind a deposit of insoluble material after all the glass has dissolved.

The other glasses may, by way of example, contain copper, silver or zinc either individually or in combination. Copper is used as a wide ranging biocide, silver also has wide ranging biocidal activity but is more generally used in combination with copper to combat the bacteria *Legionella pneumophilla* and zinc is used to provide anticorrosive activity which is also provided along with antiscaling activity by the alkali polyphosphate.

The active ions are released into the water body by diffusion of the denser solution from inside the retaining means, eg a container, into the water body. By selecting the composition of the glasses retained in the retaining means and, therefore, the dissolution rate of the glasses, the levels of ions of copper and/or silver and/or zinc and/or polyphosphate can be controlled in the water body provided that certain critical operating parameters of the system are known. Such critical operating parameters include the volume and rate of addition of make-up water due to bleed or drift losses from the system (but not due to evaporation loss which does not remove ionic species from the water body) and also the operating temperature of the water body and the total volume of the water body.

To one skilled in the art, the formulation of glasses to dissolve over different time periods is a relatively simple matter. Therefore the device can be used to release ions over periods from a few hours to many weeks or even years.

The water-soluble glass composition or each glass composition, is preferably provided in the form of granules to facilitate dissolution. The size of the perforations or the mesh at the bottom of the container will be such that any loss of granular glass from the container is prevented.

BRIEF DESCRIPTION OF THE DRAWING

An embodiment of the water-treatment system of the invention will now be described by reference to the accompanying drawing. As illustrated in the drawing one embodiment of a water-treatment system of the invention comprises a hollow cylindrical container 1 having a side wall 2, a lid 3 and a bottom wall 4. The side wall 2 and the lid 3 are formed of a water-resistant material, preferably a plastics material. The bottom wall 4 comprises a plastics mesh screen having a mesh size typically in the range of from 1 to 2 mm.

Inside the container 1 and supported by the mesh screen there is provided a body of water-soluble glass 5, preferably a copper-containing sodium poly-phosphate glass. The water-soluble glass is preferably supplied in the form of granules or particles such as may be obtained by coarsely crushing a sheet or rod of the glass.

Figure 1:
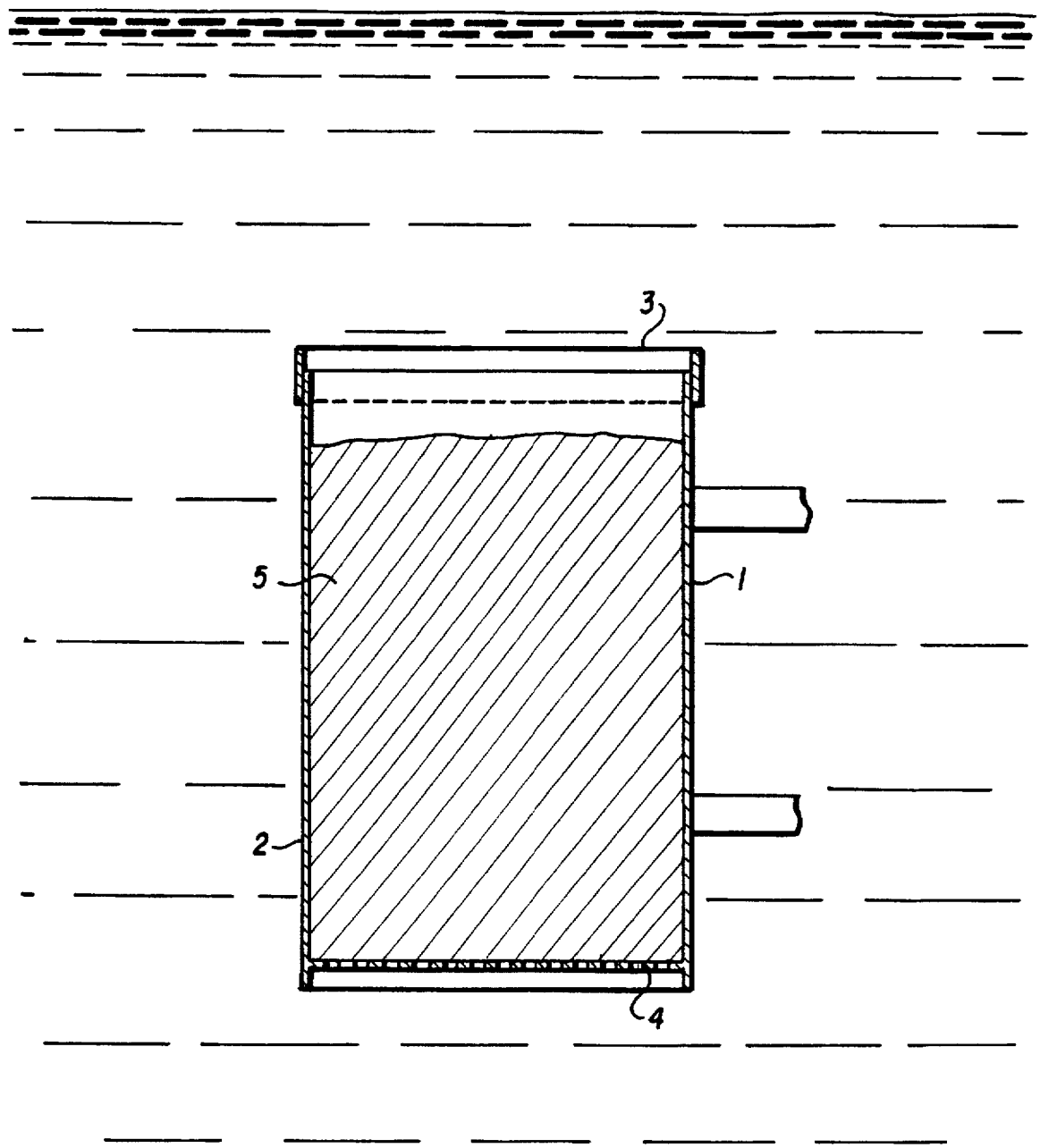

In use, the water-treatment system is submerged in water to be treated and may be supported in the water, for example by brackets attached to the container side wall and to an internal wall in the vessel containing the water to be treated or by suspension from such an internal wall by means of a rope or chain. To facilitate submersion in the water, the lid 3 of the container may be removed to allow inflow of water. After the submersion process, however, the lid should be replaced on the container so that any flow of water through the container is prevented. The mesh allows the water-soluble glass 5 in the container to be maintained in contact with water and, thus, to dissolve in the water. Since the products of dissolution are dense they diffuse through the openings in the mesh screen into the main body of water. A flow of water through the container which would prevent the required build up of dissolution products in the immediate environment of the water soluble glass is itself prevented.

EXAMPLES

Example 1

A copper containing glass of composition (wt %):

| | |
|---|---|
| $P_2O_5$ | 57.06 |
| $Na_2O$ | 24.76 |
| CuO | 18.18 | was crushed and sieved to provide granules of size range 2–8 mm. 3 kg of this glass were placed in a container as illustrated in the Figure having a mesh of 1.5 mm as the base of the container. The top was sealed with a screw lid. In the first trial with this device a small hole of 2 mm diameter was drilled in the lid to allow air to release as the water entered through the mesh. This hole was left open during the trial. This glass was expected to dissolve fully in 10 to 14 days in the water body of an industrial cooling tower. Copper levels in the water were monitored for 10 days but no increase in copper could be detected. When the device was removed after 10 days only 200 g of the glass was found to have ° 0 dissolved. The device was replaced in the water body but this time after the air had been released the hole in the lid was closed off. The copper level analysed rose rapidly to 1 ppm and then fell to about 0.5 ppm over 10 days as the glass dissolved and the total surface area of the granules reduced. After 10 days the device was removed and the glass was found to have dissolved.

The results obtained show that even the small water flow generated through the hole in the lid was sufficient to reduce dissolution products to a level at which the hardness of the water severely reduces the rate of glass dissolution.

However, left behind in the container was some 600 g of deposit which was analysed as:

| | |
|---|---|
| $P_2O_5$ | 56.28% by weight |
| $Na_2O$ | 11.06% by weight |
| CuO | 29.15% by weight |
| CaO | 3.52% by weight |

This had presumably been formed by interaction with calcium ions from the water.

The third device was produced with an addition to the 3 kg of copper glass a further 200 g of glass of composition:

| | |
|---|---|
| $P_2O_5$ | 69.92% by weight |
| $Na_2O$ | 19.49% by weight |
| CaO | 10.59% by weight | also a size 2–8 mm and with a solubility rate matched to that of the copper glass. After 10 days the device was removed from the water body and this time the deposit formation had been reduced to about 200 g.

Example 2

A Glass GS19 having the composition $P_2O_5$ 36%, $Na_2O$ 41.9%, CuO 22% and $Ag_2O$ 0.1% was incorporated at a 40% w/w loading in a polyester (Neogel 2000 from DSM Resins UK Ltd). Glass was of a particle size <106 µm. The sample of glass resin was suspended in flowing water for a period of days and at intervals removed and suspended in a beaker containing 2 litres of water. After 24 hours the water was analysed for copper and the sample returned to the flowing water. The release rate is reported in Table 1.

TABLE 1

| TIME (in days) | Copper in µg/cm²/day |
|---|---|
| 6 | 127 |
| 13 | 58 |
| 21 | 79 |
| 28 | 67 |
| 41 | 69 |

Example 3

A slower dissolving glass, AF21, having the composition $P_2O_5$ 42.8%, $Na_2O$ 7.1%, MgO 15.65%, CuO 30.0% and CaO 4.45%; was incorporated in both epoxy resin (ER) and polyester (PE) at both 20% and 40% w/w loadings. Again a particle size of <106 µm was used. The samples were tested as in Example 2 and the results are reported in Table 2.

TABLE 2

| TIME (in days) | Copper in µg/cm²/day | | | |
|---|---|---|---|---|
| | PE 20 | PE 40 | ER 20 | ER 40 |
| 2 | 5.2 | 10.3 | 1 | 2.7 |
| 15 | 4.2 | 7.7 | 0 | 3.9 |
| 29 | 3.3 | 14.9 | 1.6 | 4.7 |
| 51 | 3.7 | 15.5 | 0.9 | 3.4 |
| 73 | 3.9 | 10.5 | 1.9 | 4.0 |
| 87 | 3.6 | 7.2 | 0.6 | 3.1 |
| 102 | 2.7 | 6.0 | 0.2 | 2.9 |

It can be seen that at equivalent loadings the PE releases at a much higher rate than the ER.

I claim:

1. A water treatment system for submersion in a body of water to be treated which system comprises a water-soluble sodium polyphosphate glass treatment agent, said polyphosphate glass comprising at least one metal selected from the group consisting of copper and silver, and a water-insoluble retaining means for the water-soluble glass, the said retaining means being adapted, in use, to retain water in contact with the water-soluble glass such that the water-soluble glass dissolves in the retained water forming dissolution products therein and to allow said dissolution products to diffuse into the body of water being treated.

2. A water treatment system according to claim 1, wherein the water-insoluble retaining means comprises a hollow container formed of a water-insoluble material and having a top and a bottom, wherein the interior of the container is in communication with the exterior thereof by means of one or more openings provided at or near the bottom of the container.

3. A water treatment system according to claim 2, wherein the bottom of the container is provided with a plurality of perforations.

4. A water treatment system according to claim 2, wherein at least part of the bottom of the container is formed of mesh screen.

5. A water treatment system according to claim 1, wherein the water-soluble glass is retained in a polymer matrix.

6. A water treatment system according to claim 5, wherein the polymer matrix is formed of an epoxy resin or a polyester resin.

7. A water treatment system according to claim 5 or claim 6, wherein the amount of water-soluble glass is from 10 to 60% by weight based on the total weight of water-soluble glass and polymer matrix.

8. A water treatment system according to claim 7, wherein the amount of water-soluble glass is from 20 to 40% by weight based on the total weight of water-soluble glass and polymer matrix.

9. A water treatment system according to claims 1, wherein the water-soluble glass is in the form of granules.

10. A water treatment system according to claim 1 additionally comprising at least one additional water-soluble glass capable of dissolving at a different rate than said sodium polyphosphate glass.

11. A method of treating a body of water comprising submerging in the body of water a system according to claim 1.

* * * * *